United States Patent Office 3,054,720
Patented Sept. 18, 1962

---

3,054,720
NEMATOCIDAL 4-AMINO-3-ISOXAZOLIDONE PROCESS
Edward B. Hodge, Terre Haute, Ind., assignor to Commercial Solvents Corporation, New York, N.Y., a corporation of Maryland
No Drawing. Filed Feb. 17, 1960, Ser. No. 9,193
3 Claims. (Cl. 167—33)

My invention relates to nematocidal compositions. More particularly, it relates to nematocidal compositions having as the active ingredient 4-amino-3-isoxazolidone.

The wide-spread presence of nematodes in soil throughout the United States results in great economic loss each year. Various nematodes reduce the production of many of the more important crops such as wheat, sugar beets, potatoes, soybeans and citrus fruits. However, nematodes very seldom kill the plants which they attack but deprive them of their normal growth. Losses thus inflicted by nematodes in this way constitute a serious economic problem.

In the past, many materials and classes of materials have been recommended as nematocides. A great majority of these compositions, however, have proven not to be practical nematocides due to lack of ready availability, cost, danger of application, etc. Of equal, if not greater importance, is the fact that a particular agent may be especially effective against one or several types of nematodes but be relatively ineffective on other nematodes when applied in practical quantities. Also, particular nematodes incline to become, over long periods of time, resistant to almost every kind of known nematocide.

The efficacy of a nematocidal composition is generally measured by the amount of the active ingredient necessary to kill all nematodes in a given area.

I have now discovered that compositions containing 4-amino-3-isoxazolidone effectively destroy nematodes in the soil.

This compound is more fully described in U.S. Patent No. 2,773,878 by Shull et al. 4-amino-3-isoxazolidone, more commonly known as cycloserine, is a broad-spectrum antibacterial agent possessing activity against both gram negative and gram positive bacteria, including mycobacteria such as *Mycobacterium ranae*. The compound is produced by a species of microorganism which has been designated *Streptomyces orchidaceous*. The compound is an amphoteric substance possessing weakly acid and weakly basic groups, the compound being soluble in water but essentially insoluble in most organic solvents such as glycols, isopropyl alcohol, methanol, ethanol, acetone, hexane, benzene, chloroform, ether, petroleum ether, dioxane, 1-butanol, ethyl acetate and ethylene dichloride. The compound melts with decomposition at about 153° C.

The exact quantity of the above compound to be utilized in nematocidal compositions will vary widely and to a certain extent will depend on the type of compositions in which the material is to be employed, method of application and the particular nematode to be destroyed. In general, I have found that concentrations as low as one part of the above compound in four million parts of a carrier are sufficient to destroy nematodes. For some requirements, however, stronger concentrations may be desirable.

In utilizing the nematocidal compositions of my invention, I can incorporate the named active compound in any suitable carrier which is unreactive with the compound. Since the active compound is soluble in water, its aqueous solution can be inexpensively and readily used. However, many different carriers including solid carriers such as diatomaceous earth, solid fertilizers, etc., can be used. Also, many other ingredients such as ammonia can be incorporated into the composition of my invention.

The composition of my invention can be applied by any suitable means. One method is by spraying an aqueous solution of the active compound directly on the ground. Another, when a solid carrier is desired, is by dusting the solid composition on the ground and allowing rain water or top-dressed water to leach the active compound down into the soil.

The following examples are offered to illustrate the usefulness of my new compositions; however, I do not intend to be limited to the particular proportions, materials, etc., which are shown. Rather, I intend to include equivalents within the scope of my invention evident to those skilled in the art.

Example I

On each of ten dishes 25 mm. in diameter and 15 mm. deep, the bottoms being covered with filter paper, was placed 0.6 milliliters of egg yolk infusion. Several nematodes were then placed on each dish and kept at a temperature between 20° C. to 30° C. for five days. Ten similar dishes were prepared except that the egg yolk infusion contained one part in four million of 4-amino-3-isoxazolidone. These dishes were also kept at a temperature of between 20° C. to 30° C. for five days. At the end of the five-day period it was observed that there were large numbers of active nematodes on each of the ten dishes having egg yolk infusion which contained no active nematocide. However, on the ten dishes having incorporated into the egg yolk the active composition, no nematodes remained alive.

Example II

The experiment of Example I was conducted except that the active ingredient contained in the egg yolk infusion was present in one part in one million, instead of one part in four million. At the end of the five-day period there were a large number of active nematodes on each of the ten dishes having egg yolk infusion which contained no active nematocide. On the ten dishes having incorporated into the egg yolk infusion 4-amino-3-isoxazolidone, no nematodes remained alive.

Example III

The experiment of Example I was conducted except that the active ingredient contained in the egg yolk infusion was present in one part in 500,000 instead of one part in four million. At the end of the five-day period there were a large number of active nematodes on each of the ten dishes having egg yolk infusion which contained no active nematocide. On the ten dishes having incorporated into the egg yolk infusion 4-amino-3-isoxazolidone, no nematodes remained alive.

Example IV 0.1 gram of 4-amino-3-isoxazolidone was dissolved in 10 liters of water and the resulting solution was applied to sandy loam soil which was heavily infested with nematodes. The degree of concentration corresponded to 50 parts of the nematocidal agent per million parts by weight of soil. At the end of 7 days no living nematodes were observed in the thus-treated soil.

Now having described my invention, what I claim is:
1. A process for destroying nematodes in the soil which comprises applying directly on the soil 4-amino-3-isoxazolidone.

2. A process for destroying nematodes in the soil which comprises applying directly on the nematodes at least one part of 4-amino-3-isoxazolidone per four million parts of soil treated.

3. A process for destroying nematodes in soil which comprises applying directly on the soil about one part of 4-amino-3-isoxazolidone per four million parts of soil to about 50 parts of 4-amino-3-isoxazolidone per million parts of soil treated.

References Cited in the file of this patent
UNITED STATES PATENTS
2,772,280   Peck _____ Nov. 27, 1956